US009234977B2

(12) United States Patent
Ferber et al.

(10) Patent No.: US 9,234,977 B2
(45) Date of Patent: Jan. 12, 2016

(54) PROCESSING COLLECTED SURVEY DATA

(71) Applicant: WESTERNGECO L.L.C., Houston, TX (US)

(72) Inventors: Ralf G. Ferber, Horsham (GB); Robert Hughes Jones, Fen Drayton (GB)

(73) Assignee: WesterGeco L.L.C., Houston, TX (US)

( * ) Notice: Subject to any disclaimer, the term of this patent is extended or adjusted under 35 U.S.C. 154(b) by 214 days.

(21) Appl. No.: 13/739,859

(22) Filed: Jan. 11, 2013

(65) Prior Publication Data

US 2013/0182532 A1    Jul. 18, 2013

Related U.S. Application Data

(60) Provisional application No. 61/585,711, filed on Jan. 12, 2012.

(51) Int. Cl.
*G01V 1/38* (2006.01)
*G01V 1/36* (2006.01)

(52) U.S. Cl.
CPC ...... *G01V 1/38* (2013.01); *G01V 1/364* (2013.01); *G01V 2210/56* (2013.01)

(58) Field of Classification Search
CPC ...... G01V 1/364; G01V 2210/56; G01V 1/38
USPC .................................................. 367/21, 24
See application file for complete search history.

(56) References Cited

U.S. PATENT DOCUMENTS

| 4,853,903 | A | * | 8/1989 | Linville et al. ................. 367/46 |
| 5,587,965 | A | | 12/1996 | Dragoset, Jr. et al. |
| 5,696,734 | A | * | 12/1997 | Corrigan ......................... 367/24 |
| 6,393,366 | B1 | * | 5/2002 | Saggaf ............................. 702/17 |
| 2006/0074562 | A1 | | 4/2006 | Amundsen et al. |
| 2008/0049551 | A1 | | 2/2008 | Muyzert et al. |
| 2011/0305109 | A1 | | 12/2011 | Soubaras |
| 2012/0026830 | A1 | * | 2/2012 | Wang et al. .................... 367/24 |

FOREIGN PATENT DOCUMENTS

EP        0400775 A2    12/1990

OTHER PUBLICATIONS

Robertsson et al., "Rough-sea deghosting using a single streamer and a pressure gradient approximation", Nov. 2002, Geophysics vol. 67(6): pp. 2005-2011.
Tabti et al., "Conventional versus dual-sensor streamer data de-ghosting: a case study from a Haltenbanken survey", Aug. 2009, Fast Break 27(8): pp. 101-108.
International Search Report and Written Opinion of PCT Application No. PCT/US2013/021453 dated Apr. 29, 2013: pp. 1-11.

(Continued)

*Primary Examiner* — Ian J Lobo
(74) *Attorney, Agent, or Firm* — Abimbola Bukoye

(57) ABSTRACT

A method to perform a marine seismic survey includes obtaining marine seismic data corresponding to a subterranean formation under a water surface. The marine seismic data is generated from an underwater seismic sensor that is subject to an interference effect. The method further includes generating, by a computer processor and using a deconvolution operation, corrected marine seismic data based at least in part on the marine seismic data to compensate for the interference effect, and generating, by the computer processor, a marine seismic survey result based at least in part on the corrected marine seismic data.

17 Claims, 6 Drawing Sheets

(56) References Cited

OTHER PUBLICATIONS

Candes, et al., "l1-Magic: Recovery of Sparse Signals via Convex Programming", Technical Report, Caltech internal memo, 2005.
Kragh, et al., "A Method for Efficient Broadband Marine Acquisition and Processing", 71st EAGE Conference & Exhibition in Amsterdam, The Netherlands, 2009.
Laws, et al., "Sea surface shape derivation above the seismic streamer", Geophysical Prospecting, vol. 54, No. 6, Nov., 2006, pp. 817-828.
Parrish, et al., "Fit-for-purpose compensation of marine ghost ensembles", Expanded SEG Abstract, 2004.
Kragh, et al., "Rough Seas and Statistical Deconvolution", Geophysical Prospecting, vol. 54, 2006, pp. 475-485.
O'Brien, et al., "Recovery of a sparse spike time series by L1 norm deconvolution", IEEE Transaction on Signal Processing, vol. 42, 1994, pp. 3353-3365.
Ozdemir, et al., "Optimized deghosting of over/under towed-streamer data in the presence of noise", The Leading Edge, vol. 27, No. 2, 2008, pp. 190-199.
Scales, et al., "Robust methods in inverse theory", Inverse Problems, vol. 4, No. 4, 1988, pp. 1071-1091.
Taylor, et al., "Deconvolution with the l1 norm", Geophysics, vol. 44, 1979, pp. 39-52.
Ferber, et al., "L1 Pseudo-Vz Estimation and Deghosting of Single-Component Marine Towed-Streamer Data", SEG Istanbul International Geophysical Conference, Sep. 17, 2012, pp. 1-4.
Guitton, et al., "Adaptive Subtraction of Multiples Using the L1-norm", Geophysical Prospecting vol. 52, Jan. 1, 2004, pp. 27-38.
Information Disclosure Form filed under application 13739859 on Oct. 1, 2015, 4 pages.
Information Disclosure Form filed under application 13739859 on Aug. 23, 2015, 4 pages.
Amundsen, et al., "Rough-Sea Deghosting of Streamer Seismic Data Using Pressure Gradient Approximations", Geophysics, Society of Exploration Geophysicists, vol. 70, No. 1, Jan.-Feb. 2005, pp. V1-V9.
Supplementary Search Report issued under related EP application 13736150.7 on Sep. 22, 2015, 6 pages.
Jovanovich, et al., "Ghosting and Marine Signature Deconvolution: A Prerequisite for Detailed Seismic Interpretation", Geophysics, Society of Exploration Geophysicists, vol. 48, No. 11, Nov. 1, 1983, pp. 1468-1485.
Tabti, et al., "Conventional versus dual-sensor streamer data deghosting; A case study from the Haltenbanken dual-streamer acquisition", SEG Technical Program Expanded Abstracts 2009, Jan. 1, 2009, pp. 137-141.
Office Action issued under related EP application 13736150.7 on Oct. 6, 2015, 7 pages.

\* cited by examiner

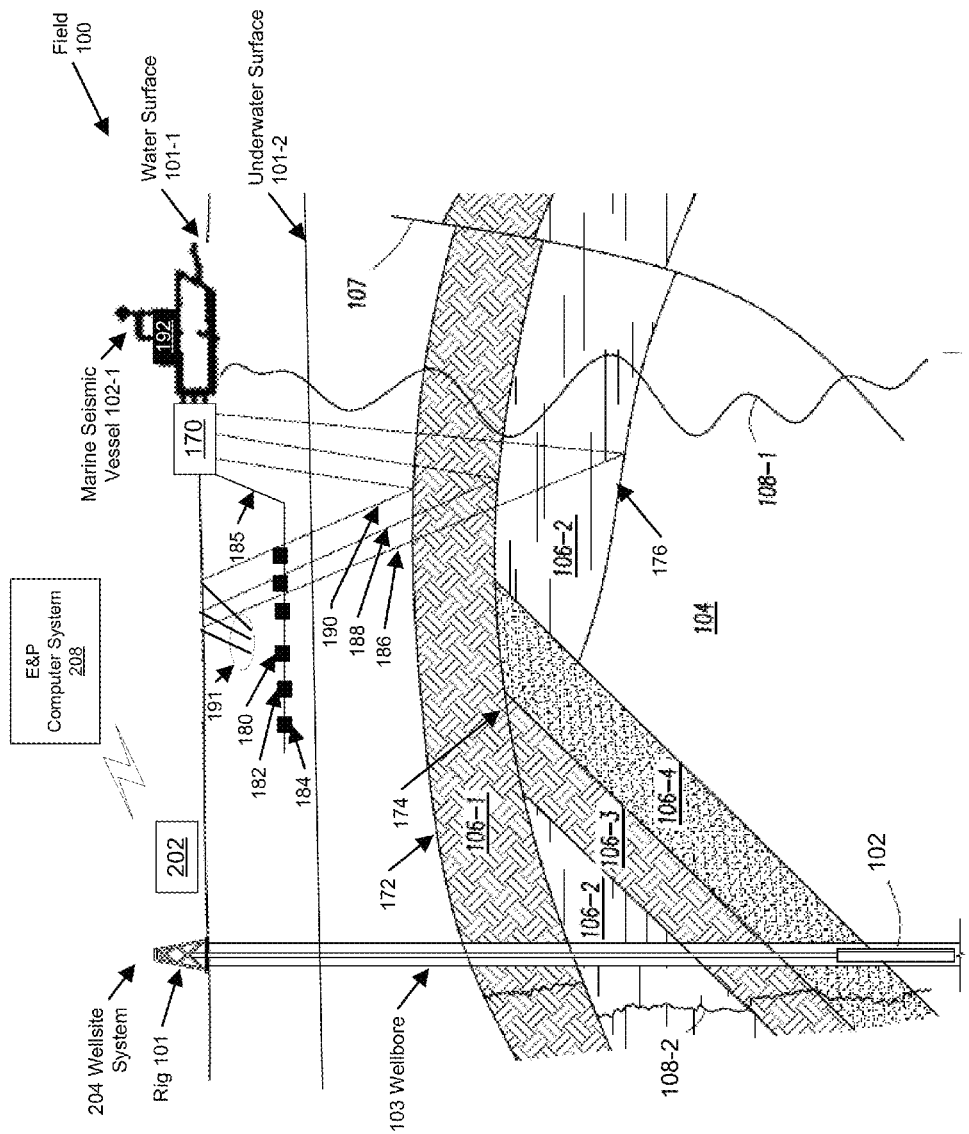
FIG. 1.1

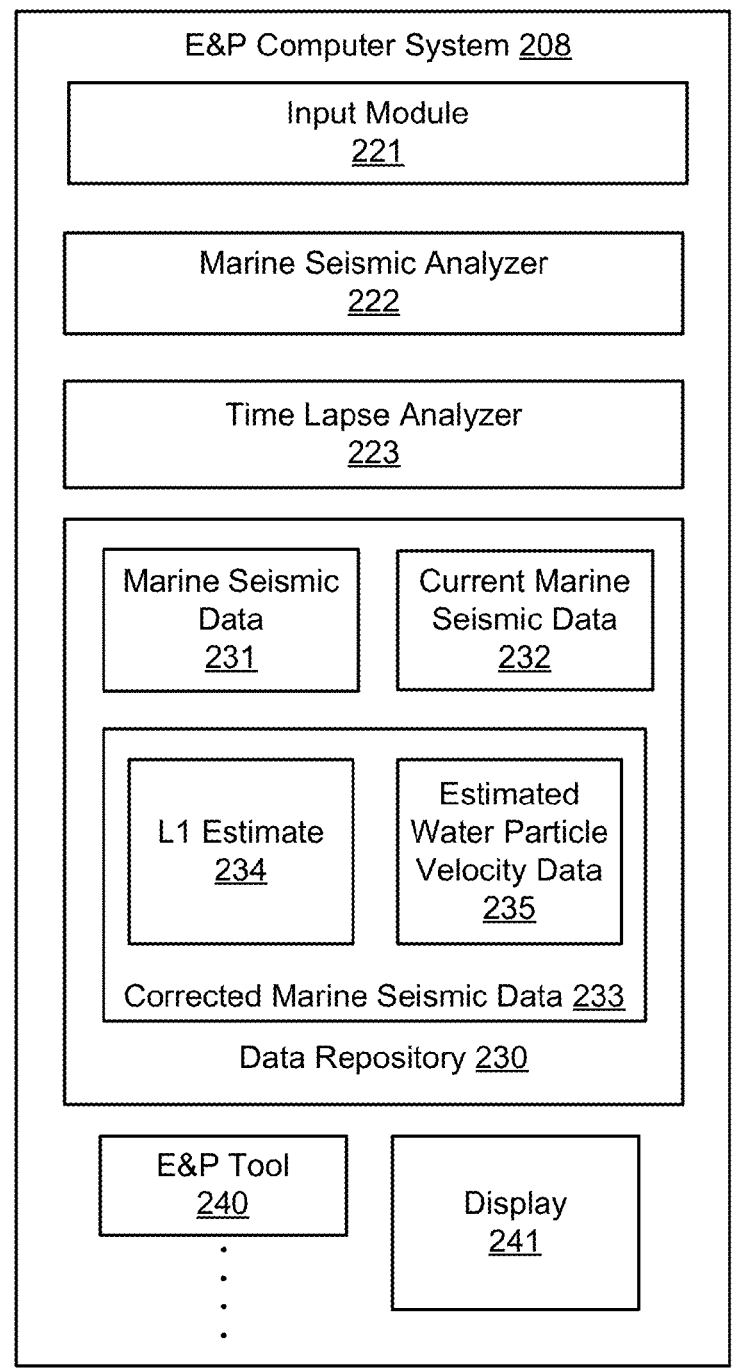
FIG. 1.2

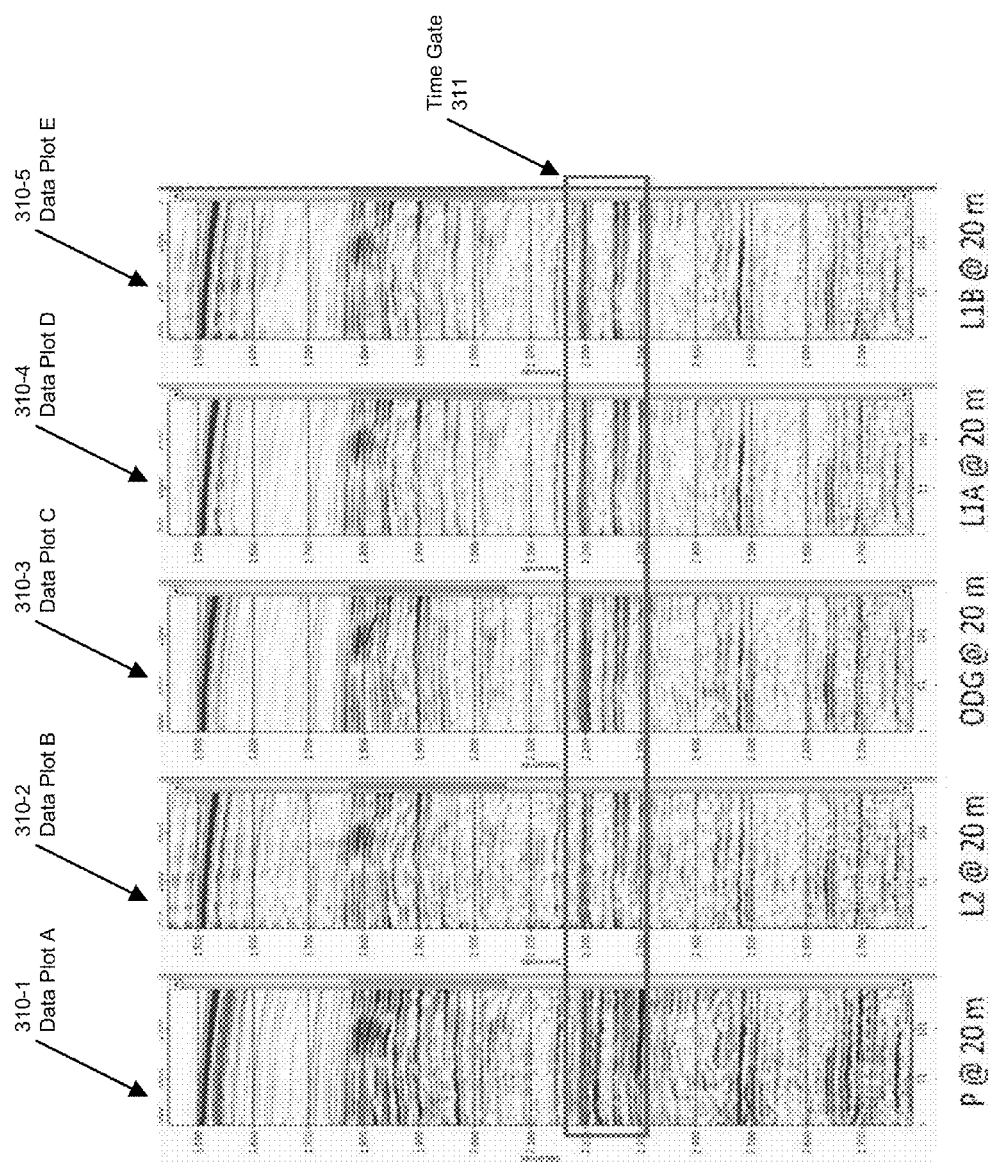
FIG. 3.1.1
FIG. 3.1.2

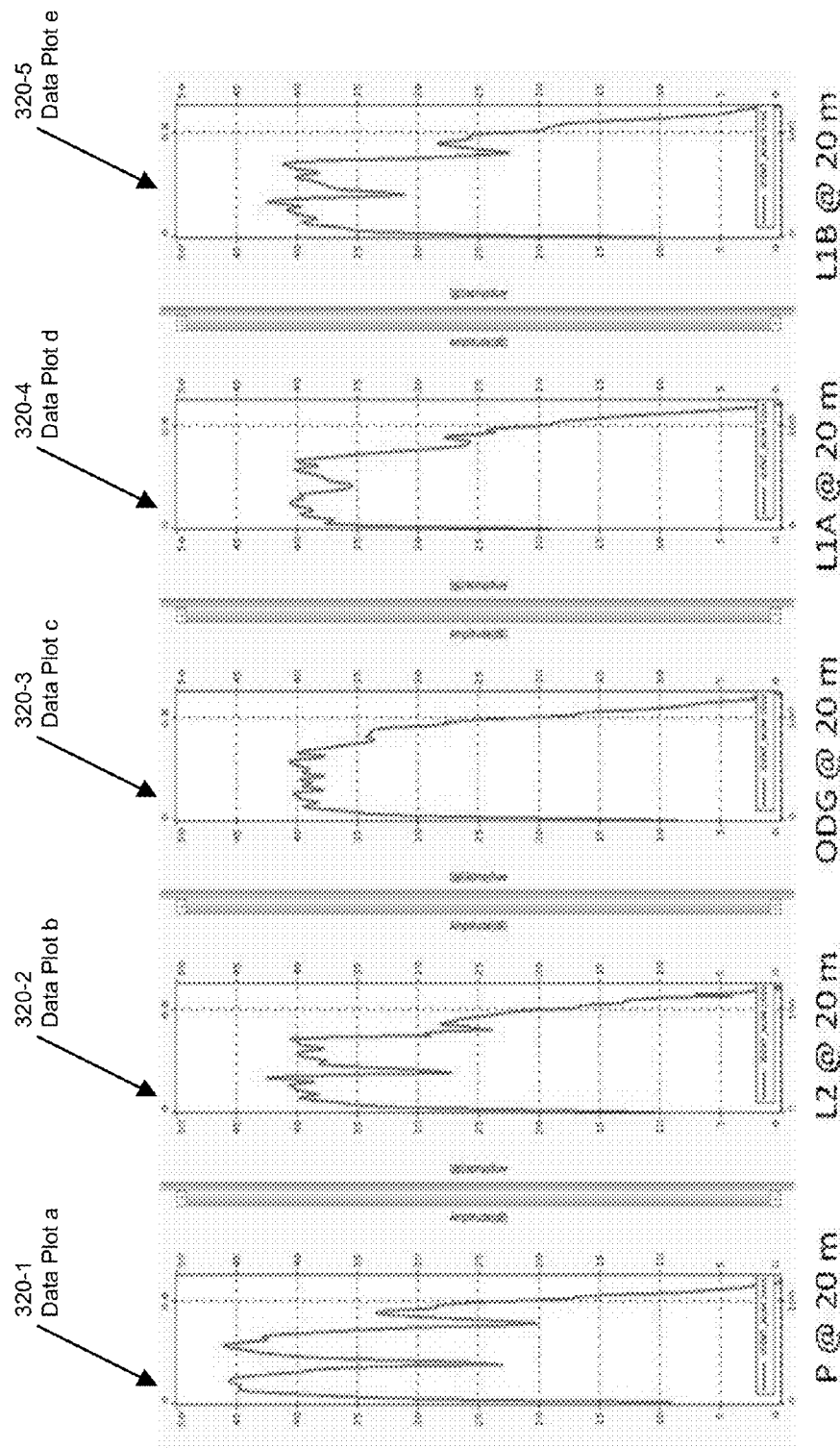
FIG. 3.2.2
FIG. 3.2.1

PROCESSING COLLECTED SURVEY DATA

CROSS-REFERENCE TO RELATED APPLICATION

This application claims the benefit of U.S. Provisional Patent Application Ser. No. 61/585,711 filed Jan. 12, 2012, which is incorporated herein by reference in its entirety.

BACKGROUND

Operations, such as geophysical surveying, drilling, logging, well completion and production, are typically performed to locate and gather valuable downhole fluids. Surveys are often performed using acquisition methodologies, such as seismic mapping, resistivity mapping, etc., to generate images of underground formations. These formations are often analyzed to determine the presence of subterranean assets, such as valuable fluids or minerals, or to determine if the formations have characteristics suitable for storing fluids. Although the subterranean assets are not limited to hydrocarbons such as oil, throughout this document, the terms "oilfield" and "oilfield operation" may be used interchangeably with the terms "field" and "field operation" to refer to a site (on land or over water) where any types of valuable fluids or minerals may be found and the activities required to extract them. The terms may also refer to sites where substances are deposited or stored by injecting them into the surface using boreholes and the operations associated with this process. Further, the term "field operation" refers to a field operation associated with a field, including activities related to field planning, wellbore drilling, wellbore completion and/or production using the wellbore.

Models of subsurface hydrocarbon reservoirs and oil wells are often used in simulation (e.g., in modeling oil well behavior) to increase yields and to accelerate and/or enhance production from oil wells. Seismic interpretation tools and seismic-to-simulation programs may include numerous functionalities and apply complex techniques across many aspects of modeling and simulating. Such programs typically include a large suite of tools and different programs, collectively referred to as an exploration and production (E&P) tool. Users of such systems may spend many hours per day working with these tools in an effort to optimize geological interpretations and reservoir engineering development scenarios.

Marine time-lapse survey compares a series of marine seismic data captured at varying time intervals (e.g., 6-month interval, 1-year interval, etc.) over an extended time period. The series of marine seismic data are compared to detect changes in a subterranean geological structure (e.g., a reservoir) under water. For example, structural changes in a reservoir may be analyzed to determine hydrocarbon drainage status as a function of on-going production. Recent technology upgrades in marine seismic survey include improved seismic data bandwidth due to additional velocity information available using multi-component towed streamers. However, historical data from previous marine seismic surveys, without the benefit of these later technology upgrades, may suffer from lower bandwidth. Accordingly, marine time-lapse surveys based on such historical data may not benefit from the improved seismic data bandwidth of any current marine seismic survey. In other words, the current marine seismic survey has to be downgraded to the lower bandwidth before such survey may be compared to the historical data during the marine time-lapse survey.

SUMMARY

In general, in one aspect, embodiments relate to a method to perform a marine seismic survey. The method includes obtaining marine seismic data corresponding to a subterranean formation under a water surface. The marine seismic data is generated from an underwater seismic sensor that is subject to an interference effect. The method further includes generating, by a computer processor and using a deconvolution operation, corrected marine seismic data based at least in part on the marine seismic data to compensate for the interference effect, and generating, by the computer processor, a marine seismic survey result based at least in part on the corrected marine seismic data.

In general, in one aspect, embodiments relate to a system for performing a marine seismic survey. The system includes a computer processor, a marine seismic analyzer executing on the computer processor and configured to obtain marine seismic data corresponding to a subterranean formation under a water surface. The marine seismic data is generated from an underwater seismic sensor that is subject to an interference effect. The marine seismic analyzer is further configured to generate, using a deconvolution operation, corrected marine seismic data from the marine seismic data to compensate for the interference effect, and generate a marine seismic survey result based at least in part on the corrected marine seismic data. The system further includes a repository configured to store the marine seismic data, the corrected marine seismic data and the marine seismic survey result.

In general, in one aspect, embodiments relate to a non-transitory computer readable medium that includes instructions for performing marine seismic survey. The instructions are for obtaining marine seismic data corresponding to a subterranean formation under a water surface, where the marine seismic data is generated from an underwater seismic sensor that is subject to an interference effect, generating, using a deconvolution operation, corrected marine seismic data based at least in part on the marine seismic data to compensate for the interference effect, and generating a marine seismic survey result based on the corrected marine seismic data.

Other aspects of processing collected survey data will be apparent from the following description and the appended claims.

BRIEF DESCRIPTION OF DRAWINGS

The appended drawings illustrate several embodiments of processing collected survey data and are not to be considered limiting of its scope, for processing collected survey data may admit to other equally effective embodiments.

FIG. 1.1 is a schematic view, partially in cross-section, of a field in which one or more embodiments of processing collected survey data may be implemented.

FIG. 1.2 shows a marine seismic computer system in accordance with one or more embodiments.

FIGS. 3.1.1, 3.1.2, 3.2.1 and 3.2.2 depict an example for processing collected survey data in accordance with one or more embodiments.

DETAILED DESCRIPTION

Figure 2:
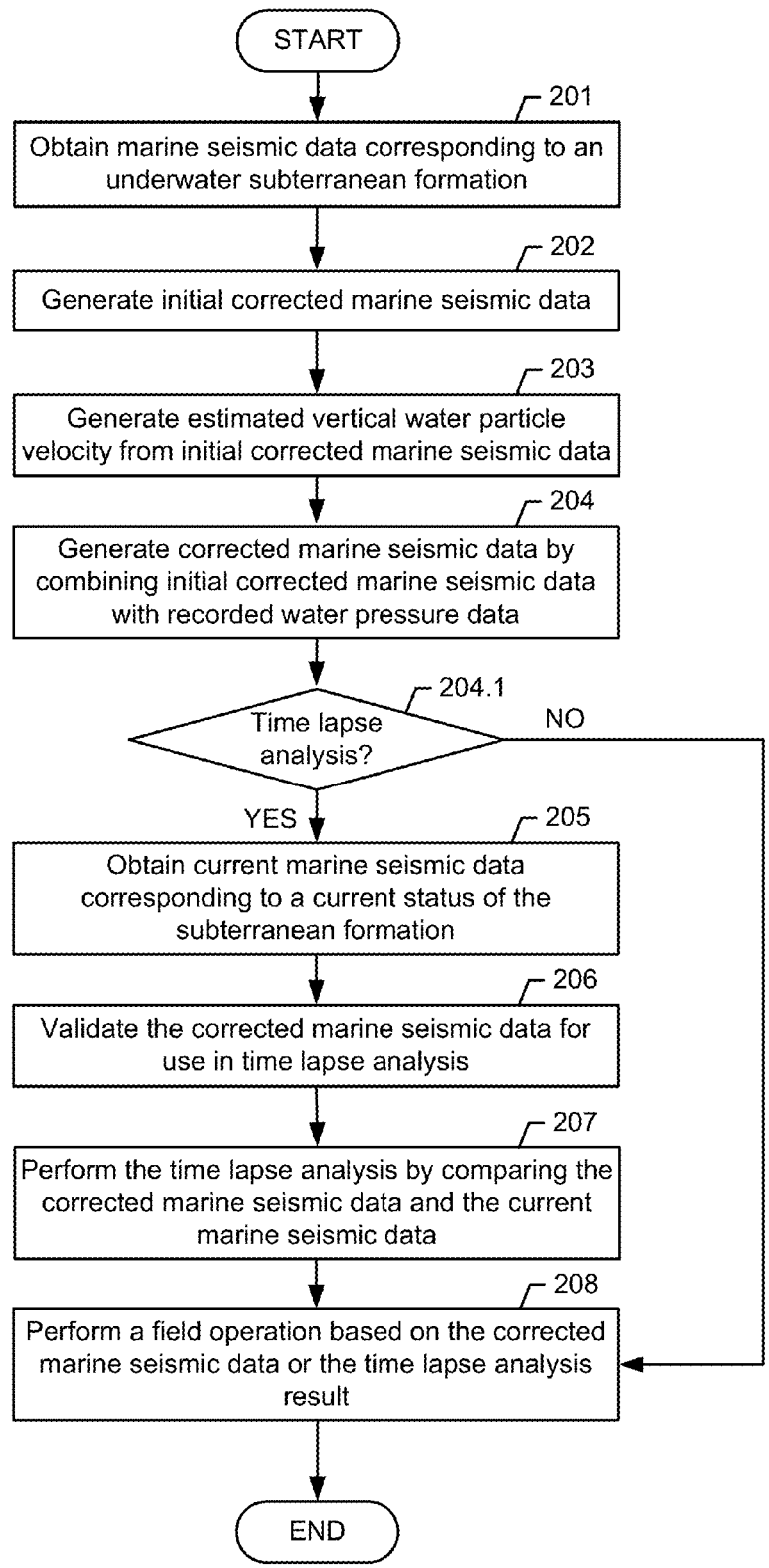
FIG. 2 depicts an example flowchart of a method for processing collected survey data in accordance with one or more embodiments.

Embodiments are shown in the above-identified drawings and described below. In describing the embodiments, like or identical reference numerals are used to identify common or similar elements. The drawings are not necessarily to scale and certain features may be shown exaggerated in scale or in schematic in the interest of clarity and conciseness.

Embodiments of the present disclosure include a method, system and computer readable medium for generating corrected marine seismic data from marine seismic data. The corrected marine seismic data compensates for data degradation due to interferences caused by seismic wave reflection of the water surface. Accordingly, an improved marine seismic survey result is generated from the marine seismic data based on the corrected marine seismic data. In one or more embodiments, the marine seismic data includes pressure data generated by an underwater seismic sensor. The pressure data represents characteristics of a subsurface three-dimensional geologic formation in one or more embodiments.

The corrected marine seismic data is generated using a deconvolution operation that accounts for a depth of the underwater seismic sensor. In one or more embodiments, the deconvolution operation includes applying L1-deghosting to the pressure data to generate an L1-deghosted dataset as an estimate of an up-going seismic wave data. For example, the L1-deghosted dataset may be in a wavenumber-frequency domain, or a ray-parameter-time domain. In one or more embodiments, an up-going seismic wavefield is estimated based at least in part on a weighted summation of the pressure data and the L1-deghosted dataset.

FIG. 1.1 depicts a schematic view, partially in cross section, of a field (100) in which one or more embodiments of processing collected survey data may be implemented. In one or more embodiments, one or more of the modules and elements shown in FIG. 1.1 may be omitted, repeated and/or substituted. Accordingly, embodiments of processing collected survey data should not be considered limited to the specific arrangements of modules shown in FIG. 1.1.

As shown in FIG. 1.1, the subterranean formation (104) is under a body of water, for example sea or lake where the underwater surface (101-2) may be the sea floor or lake floor. Further, the subterranean formation (104) includes several geological structures (106-1 through 106-4). As shown, the formation has a sandstone layer (106-1), a limestone layer (106-2), a shale layer (106-3), and a sand layer (106-4). A reservoir may be formed by one or more of these layers. A fault line (107) extends through the formation. In one or more embodiments, various survey tools and/or data acquisition tools are adapted to measure the formation and detect the characteristics of the geological structures of the formation.

As shown in FIG. 1.1, a marine seismic vessel (102-1) at the water surface (101-1) represents a survey tool that is adapted to measure properties of the subterranean formation (104) in a marine seismic survey operation based on sound vibrations. Such sound vibration generated by a source (170) reflects off horizons (e.g., 172, 174, 176) in the subterranean formation (104). The primary reflected sound vibrations (e.g., 186, 188, 190) are referred to as up-going seismic waves that are received by one or more sensors (e.g., 180, 182, 184) along a cable (185) (shown as towed with the source (170) by the marine seismic vessel (102-1)). Secondary reflections (191) from the water surface (101-1) are referred to as reflected downward seismic waves that may enhance or reduce the signals received by these sensors (e.g., 180, 182, 184) due to an interference effect with the primary reflection. The signal enhancing or reducing effects are referred to as a constructive interference or a destructive interference, respectively depending on the phase shift between the primary and secondary reflections. The sensors produce electrical output signals, which may be transmitted, for example, as input data to a computer (192) on the marine seismic vessel (102-1). In response, the computer (192) may log and provide the received data to a surface unit (202) for further analysis. Generally, the data provided to the surface unit (202) is referred to as marine seismic data.

In one or more embodiments, the sensors (e.g., 180, 182, 184) are conventional pressure sensors used in conventional marine surveys. In such embodiments, the data provided to the surface unit (202) includes pressure data associated with the sound vibrations. In one or more embodiments, the sensors (e.g., 180, 182, 184) are pressure/velocity sensors on a multi-component towed streamer (e.g., dual-sensor streamer) used in more recent marine surveys. In such embodiments, the data provided to the surface unit (202) includes pressure data and velocity data of water particle motion (e.g., vertical component of the water particle velocity).

Generally, marine seismic data resides in a certain frequency range between a lowest frequency, typically around 3-5 Hz, and a highest frequency, typically around 100 Hz. This band however may have "holes," i.e., frequencies at which no or only very low amount of signal exists, due to the destructive interference of up-going and downgoing seismic waves. Bandwidth is the difference of the highest frequency and the lowest frequency in the marine seismic data, minus any frequency bands at which the signal is too low. A survey (i.e., one or more sets of marine seismic data) with a lower frequency than the lowest frequency of another survey and a higher frequency than the highest of another survey is referred to a higher bandwidth survey while the another survey is referred to as a lower bandwidth survey. Further, the higher bandwidth survey may have no hole or less holes within the bandwidth as compared to the lower bandwidth survey. The sensor and/or other equipment used to generate the higher bandwidth survey are referred to as the higher bandwidth sensor/equipment, and vice versa.

Higher bandwidth marine seismic data, when compared to a lower bandwidth marine seismic data, allows a better temporal resolution of subsurface strata. In one or more embodiments, the pressure-only sensors and corresponding marine seismic data are referred to as lower bandwidth equipments and lower bandwidth marine seismic data. In contrast, the pressure/velocity sensors on a multi-component towed streamer and corresponding marine seismic data are referred to as higher bandwidth equipment and higher bandwidth marine seismic data, respectively.

Further as shown in FIG. 1.1, the wellsite system (204) is associated with a rig (101), a wellbore (103), and other wellsite equipment. The wellsite system (204) is configured to perform wellbore operations, such as logging, drilling, fracturing, production, or other applicable operations. Generally, survey operations and wellbore operations are referred to as field operations of the field (100). These field operations are typically performed as directed by the surface unit (202).

In one or more embodiments, the surface unit (202) is operatively coupled to the computer (192) and/or a wellsite system (204). In particular, the surface unit (202) is configured to communicate with the computer (192) and/or the data acquisition tool (102), to send commands to the computer (192) and/or the data acquisition tools (102), and to receive data therefrom. For example, the data acquisition tool (102) may be adapted for measuring downhole properties using logging-while-drilling ("LWD") tools. In one or more embodiments, the surface unit (202) may be located at the wellsite system (204) and/or remote locations (e.g., on land). The surface unit (202) may be provided with computer facilities for receiving, storing, processing and/or analyzing data from the computer (192), the data acquisition tool (102), or other part of the field (104). The surface unit (202) may also be provided with or functionally for actuating mechanisms at the field (100). The surface unit (202) may then send command signals to the field (100) in response to data received, for example, to control and/or optimize various field operations described above.

In one or more embodiments, the data received by the surface unit (202) represents characteristics of the subterranean formation (104) and may include marine seismic data and/or information related to porosity, saturation, permeability, natural fractures, stress magnitude and orientations, elastic properties, etc., during a drilling, fracturing, logging, or production operation of the wellbore (103) at the wellsite system (204). For example, the data plot (108-1) may be a seismic two-way response time or other type of marine seismic measurement data. In another example, the data plot (108-2) may be a wireline log, which is a measurement of a formation property as a function of depth taken by an electrically powered instrument to infer properties and make decisions about drilling and production operations. The record of the measurements, typically on a long strip of paper, may also be referred to as a log. Measurements obtained by a wireline log may include resistivity measurements obtained by a resistivity measuring tool. In yet another example, the data plot (108-2) may be a plot of a dynamic property, such as the fluid flow rate over time during production operations. Those skilled in the art, with the benefit of this disclosure, will appreciate that other data may also be collected, such as, but not limited to, historical data, user inputs, economic information, other measurement data and other parameters of interest.

In one or more embodiments, the surface unit (202) is communicatively coupled to an exploration and production (E&P) computer system (208). In one or more embodiments, the data received by the surface unit (202) may be sent to the E&P computer system (208) for further analysis. Generally, the E&P computer system (208) is configured to analyze, model, control, optimize or perform other management tasks of the aforementioned field operations based on the data provided from the surface unit (202). In one or more embodiments, the E&P computer system (208) is provided with functionality for manipulating and analyzing the data, such as performing seismic interpretation or borehole resistivity image log interpretation to identify geological surfaces in the subterranean formation (104). By way of another example, the manipulating and analyzing may include performing simulation, planning, and optimization of production operations of the wellsite system (204). For example, the seismic interpretation may include marine time-lapse analysis to identify geological structure changes in the subterranean formation (104). The geological structural changes may be correlated to the borehole resistivity image log or other analysis result from other borehole logs. Such correlation may be used to make decisions for the aforementioned field operations. For example, the marine time-lapse analysis, separately or in combination with borehole log analysis results, may indicate that hydrocarbon drainage has been minimal in certain part of the reservoir. Accordingly, additional wells are drilled to access those parts of the reservoir. In one or more embodiments, the result generated by the E&P computer system (208) may be displayed for user viewing using a 2 dimensional (2D) display, 3 dimensional (3D) display or other suitable displays. Although the surface unit (202) is shown as separate from the E&P computer system (208) and computer (192) in FIG. 1.1, in other examples, the surface unit (202), the E&P computer system (208), and computer (192) may be combined into a single device or multiple devices.

FIG. 1.2 shows more details of the E&P computer system (208) in which one or more embodiments of processing collected survey data may be implemented. In one or more embodiments, one or more of the modules and elements shown in FIG. 1.2 may be omitted, repeated and/or substituted. Accordingly, embodiments of processing collected survey data should not be considered limited to the specific arrangements of modules shown in FIG. 1.2.

In one or more embodiments, the E&P computer system (208) is configured with functionalities that include updating, enhancing, upgrading and/or altering existing survey data collected with a lower bandwidth survey equipment with new data collected by a higher bandwidth survey equipment (e.g., an improved underwater marine seismic sensor). In some embodiments, the updating, enhancing, upgrading and/or altering existing survey data involves the acquiring and processing of multi-component higher bandwidth towed streamer data, with the capability of bandwidth upgrading of the existing lower bandwidth surveys performed with an earlier generation of survey equipment.

Generally, marine seismic surveys are subject to destructive interferences from seismic wave reflection of the water surface. Depending on seismic wavelength and primary/secondary reflection ray path differences, the phase shift between the up-going seismic wave and the reflected downward seismic wave may cause such destructive interferences that the seismic signal strength is greatly reduced at one or more frequencies. The signal bandwidth of the marine seismic data may be lowered since these destructive interference frequencies are removed from the spectrum due to the reduced signal strengths. In addition, the seismic signal strength may be greatly increased at other frequencies due to constructive interferences. A combination of the destructive and constructive interferences may cause a seismic image artifact referred to as a pressure wave surface ghost (or simply "pressure wave ghost").

To suppress the pressure wave ghost, an inverse filter approach may be used to estimate the vertical component of the particle motion data from the pressure data. Specifically, an inverse filter may be applied for the pressure wave surface ghost, followed by a filtering step that introduces the ghost of the vertical component of particle motion data, and followed by an incidence angle dependent scaling step. The pressure wave ghost may include a replication of the up-going seismic wave with a certain time delay and a polarity reversal. The ghost of the vertical component of particle motion (referred to as the particle motion ghost) may include a replication of the up-going seismic wave with the same time delay but no polarity reversal. Hence, a summation of data with a pressure ghost and another data set with a particle motion ghost cancels the ghost and yields the up-going seismic wave. This inverse filter approach is not able to provide information at the notch frequencies of the incidence angle dependent sea-surface ghost wavelet. The ghost wavelet is a spike at time zero followed by a negative spike after a delay, which is the transit time of the up-going seismic wave to the sea-surface and back to the sensor. Another approach may estimate the vertical component of the particle motion from the pressure wave data based on the fact that the pressure is zero at the sea-surface. This approach is limited to frequencies below the first ghost notch, a frequency band that gets narrower with seismic sensor depth (e.g., streamer depth).

In one or more embodiments, the E&P computer system (208) is configured to enhance the lower bandwidth surveys with de-ghosting techniques based on a sparsity assumption of the underlying data. Sparsity refers to the fact that the seismic waves include a relatively low number of subsurface reflection events. In such embodiments, the aforementioned inverse filtering step is not used. As a quality control measure, the de-ghosting techniques are also applied to the pressure component of the multi-component data to produce a pseudo-Vz data set, which is a mathematical estimate of the vertical component of the particle motion measurement. If the differences between the mathematical estimate and the vertical component of the particle motion measurement are minimal, the de-ghosting technique may be applied to all lower bandwidth surveys preceding the first high bandwidth survey. The high bandwidth survey (e.g., the multi-component data) may also help in selecting any processing parameters in the upgrading workflows. For example, these processing parameters may be adjusted to minimize the differences between the mathematical estimate and the vertical component of the particle motion measurement when the upgrading workflows are applied to the high bandwidth survey using the adjusted processing parameters.

As shown in FIG. 1.2, the E&P computer system (208) includes an input module (221), a marine seismic analyzer (222), a time lapse analyzer (223), a data repository (230), other E&P tools (e.g., E&P tool (240)), and a display (241). Each of these elements is described below.

In one or more embodiments, the E&P computer system (208) includes the input module (221) that is configured to obtain the marine seismic data (231) corresponding to the subterranean formation (104). The marine seismic data (231) may also be referred to as collected data. As noted above, in one or more embodiments, the marine seismic data is generated from an underwater seismic sensor (e.g., sensors (180, 182, 184) shown in FIG. 1.1) and is degraded due to destructive interferences caused by the seismic wave reflection of the water surface (e.g., water surface (101-1) shown in FIG. 1.1).

In one or more embodiments, the E&P computer system (208) includes the marine seismic analyzer (222) that is configured to generate corrected marine seismic data (233) from the marine seismic data (231). The corrected marine seismic data compensates for data degradation due to the destructive interferences. In one or more embodiments, the corrected marine seismic data (233) is generated using a deconvolution operation that is determined at least by a depth of the underwater seismic sensor (e.g., sensors (180, 182, 184) shown in FIG. 1.1). In particular, the deconvolution operation, in combination with subsequent data processing, generates an L1 estimate (234) and the estimated water particle velocity data (235). One or more of the L1 estimate (234) and estimated water particle velocity data (235) may be part of or used to generate the corrected marine seismic data (233). Additional details of the L1 estimate (234), the estimated water particle velocity data (235) and the corrected marine seismic data (233) are described in reference to FIG. 2 below.

In one or more embodiments, the marine seismic analyzer (222) is further configured to generate a marine seismic survey result (not shown) from the marine seismic data (231) at least based on the corrected marine seismic data (233). For example, the marine seismic survey result may be a 3D seismic image of geologic structures of the subterranean formation (104). In particular, details in the 3D seismic image may be supplemented based on the corrected marine seismic data (233). The supplementing compensates for inherent lack of details due to the aforementioned destructive interferences. In another example, the marine seismic survey result may be a marine time lapse analysis based on the marine seismic data (231) and the current marine seismic data (232).

To perform the marine time lapse analysis, in one or more embodiments, the input module (221) that is further configured to obtain the current marine seismic data (232) corresponding to a current status of the subterranean formation (104). The marine seismic data (231) (or collected data) may correspond to historical survey data, such as from a vintage survey. A vintage survey is a prior survey from an extended time period before, such as 6 month or a number of years ago. As noted above, the current marine seismic data (232) is generated from an improved underwater seismic sensor (e.g., upgraded version of sensors (180, 182, 184) shown in FIG. 1.1) and is less degraded due to the aforementioned destructive interferences effect. In one or more embodiments, the E&P computer system (208) includes the time-lapse analyzer (223). The time lapse analyzer (223) is configured to detect, in response to determining a difference between the marine seismic survey result and the current marine seismic data (232), a change in a geologic structure in the subterranean formation (104) that occurred subsequent to generating the historical survey data. In one or more embodiments, the generating the historical survey data occurred when the underwater marine seismic sensors captured the historical survey data or raw data from which the historical survey data may be based.

In one or more embodiments, the E&P computer system (208) includes the display (241) that is configured to display the marine seismic survey result. For example, the display (241) may be a 2D display device or a 3D display device.

In one or more embodiments, the E&P computer system (208) further includes functionality to communicate with the surface unit (202) to manage (e.g., analyze, model, control, optimize, or perform other management tasks) the aforementioned field operations based on the marine seismic survey result. One or more field operation management tasks (e.g., analysis task, modeling task, control task, optimization task, etc.) may be performed using the E&P tool (240) whose configuration and/or operating parameters may be determined and/or adjusted based on the marine seismic survey result. For example, the E&P tool (240) may include one or more of a reservoir modeling application, a drilling steering application, a fracturing simulation application, etc.

In one or more embodiments, the data repository (230) (and/or any of the dataset contained therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The data repository (230) may be a device internal to the E&P computer system (208). Alternatively, the data repository (230) may be an external storage device operatively connected to the E&P computer system (208). The processor and memory of the E&P computer system (208) are not explicitly depicted in FIG. 1.2 so as not to obscure other elements of the E&P computer system (208). An example of such processor and memory is described in reference to FIG. 4 below.

FIG. 2 depicts an example method for processing collected survey data in accordance with one or more embodiments. For example, the method depicted in FIG. 2 may be practiced using the E&P computer system (208) described in reference to FIGS. 1.1 and 1.2 above. In one or more embodiments, one or more of the elements shown in FIG. 2 may be omitted, repeated, and/or performed in a different order. Further, aspects of other embodiments from the present disclosure may also be combined with the method illustrated in FIG. 2. Accordingly, embodiments of processing collected survey data should not be considered limited to the specific arrangements of elements shown in FIG. 2.

Initially, in Element 201, marine seismic data is obtained that corresponds to a subterranean formation under a water surface. In one or more embodiments, the marine seismic data is generated from an underwater seismic sensor, where the marine seismic data is degraded due to destructive interferences caused by seismic wave reflection of the water surface. This type of degradation is common in vintage surveys. In one or more embodiments, the underwater seismic sensor is a water pressure sensor attached to an underwater towed cable (referred to as a streamer). The marine seismic data may include water pressure data (referred to as towed marine pressure recordings) generated from such underwater seismic sensor as the water pressure sensor. In particular, the water pressure sensor may lack the functionality to measure velocity of the water particle motion induced by seismic waves. This type of underwater seismic sensor is commonly used in vintage surveys. In one or more embodiments, the marine seismic data obtained in Element 201 is from a vintage survey.

In one or more embodiments, the water pressure data of a vintage survey may be upgraded to be better comparable to the multi-component data. In one or more embodiments, the upgrading process includes the data processing described in Element 202 below. The upgraded historical survey data yields an estimate of the up-going seismic wavefield, which then may be used in a time lapse analysis for comparing to the up-going seismic wavefield as computed from the multi-component data. For example, the estimate of the up-going seismic wavefield in the historical survey data may be subtracted from the up-going seismic wavefield of the multi-component data in a later survey to detect a change in the geological structure that has occurred between the generating of the historical survey data and the later survey.

In Element 202, initial corrected marine seismic data is generated from the marine seismic data to compensate for data degradation due to the destructive interferences. In one or more embodiments, the initial corrected marine seismic data is generated using a deconvolution operation. The deconvolution operation accounts for a depth of the underwater seismic sensor. For example, the deconvolution operation may be based on an n-dimensional matrix operator (referred to as a ghost operator) having an n-dimensional ghost wavelet along the diagonal of the matrix operator, where n represents a number of time samples in the marine seismic data. Specifically, the ghost wavelet represents an interference effect of the seismic wave reflection determined by the depth of the underwater seismic sensor.

In one or more embodiments, a system of linear equations relates the marine seismic data to an up-going seismic wave from the subterranean formation. The up-going seismic wave and the reflection thereof from the water surface are combined and captured by the underwater seismic sensor as recorded pressure wave data. In those embodiments where the marine seismic data is generated from water pressure sensors lacking the functionality to measure other data (e.g., velocity of the water particle motion), the marine seismic data is just the recorded pressure wave data.

In one or more embodiments, the aforementioned system of linear equations is based on the n-dimensional matrix (i.e., ghost operator) and is solved in the deconvolution operation using an L1 solver. The solution of the system of the linear equations solved in the deconvolution operation is an estimate (e.g., estimated magnitude) of the up-going seismic wave. This estimate obtained using the L1 solver is referred to as the L1 estimate. This technique of using the L1 solver to generate the L1 estimate and using the L1 estimate to represent the up-going seismic wave component of the recorded pressure wave data is referred to as L1-deghosting. In particular, extracting the up-going seismic wave component from the recorded pressure wave data amounts to restoring the subterranean formation seismic waves by mathematically removing the effect of the downward seismic reflection of the water surface, and, therefore, is referred to as "deghosting." In a reverse order and consistent with the physical principal of the seismic wave interferences, convolving the L1 estimate of the up-going seismic wave with the ghost wavelet (i.e., applying the ghost operator to the L1 estimate) approximates the actual recorded pressure wave data.

In one or more embodiments, the L1 estimate is computed such that the summed magnitude of the difference between the solution and a provided reference is minimized. This is in contrast to L2 solvers which minimize the sum of squared differences.

In one or more embodiments, the aforementioned system of the linear equations is represented mathematically as a vector equation $$\vec{d}(p) = G_p \vec{u}(p) \qquad \text{(Eq. 0)}$$

with $\vec{d}(p)$ denoting the recorded pressure wave data in tau-p domain, $\vec{u}(p)$ denoting the up-going wavefield, and $G_p$ denoting a signal processing filter (referred to as the pressure ghost operator) that creates ghosted data from up-going waves. Specifically, $G_p$ is an n by n square matrix with the ghost wavelet along its diagonal, were n is the number of time samples of the data.

In one or more embodiments, the L1 estimate is used as the initial corrected marine seismic data. In one or more embodiments, in Element 203, estimated water particle velocity data is generated from the L1 estimate to refine the initial corrected marine seismic data. In one or more embodiments, the estimated water particle velocity data is generated from the L1 estimate using a convolution operator. This is described in wavenumber-frequency domain as below.

Generally, the marine seismic data is acquired in the space-time domain. Wavenumber and frequency are the Fourier domains for space and time, respectively. In one or more embodiments, the marine seismic data is transformed from space-time domain to wavenumber-frequency domain by a two-dimensional Fourier transform.

In one or more embodiments, the result from L1-deghosting, i.e., the L1 estimate (denoted as $u_{L1}(k, \omega)$) of the up-going seismic wavefield is used to estimate the vertical component (denoted as $V_z(k, \omega)$) of the particle motion by convolution of the L1 estimate with an angle dependent ghost wavelet (corresponding to the particle motion ghost operator $G_v(k,\omega)$) of the particle motion data, followed by multiplication with the obliquity factor $$F(k, \omega) = \frac{\rho\omega}{k_z}).$$

(i.e., Conventionally, the vertical component of the particle motion may be related to the pressure data (denoted as $P(k, \omega)$) via Equation 1:

$$-F(k, \omega)V_{z,L2}(k, \omega) = G_V(k, \omega)\frac{P(k, \omega)}{G_P(k, \omega)}, \qquad \text{(Eq. 1)}$$

with $$F(k, \omega) = \frac{\rho\omega}{k_z}$$

Equation 1 essentially computes a scaled version (denoted as $V_{z,L2}(k,\omega)$) of the vertical component of the particle motion by inverse filtering the pressure data by its pressure ghost (corresponding to the pressure ghost operator $G_p(k,\omega)$) followed by introduction of the particle motion ghost (corresponding to the particle motion ghost operator $G_v(k,\omega)$) by convolution. This formula may not be used for actual computations due to the division by zero at the notch frequencies of the pressure ghost. In one or more embodiments, the L1 estimate $u_{L1}(k,\omega)$ is used to substitute the ratio in eq. (1) to give Equation 2:

$$-F(k,\omega)V_{z,L1}(k,\omega)=G_V(k,\omega)u_{L1}(k,\omega) \quad \text{(Eq. 2)}$$

where $V_{z,L1}(k,\omega)$ represents the estimate of the vertical component of the particle motion from pressure data solely and may be expressed as:

$$V_{z,L1}(k,\omega) = -\frac{G_V(k,\omega)}{F(k,\omega)}u_{L1}(k,\omega) \quad \text{(Eq. 3)}$$

In the discussion above, the particle motion ghost operator $G_V$ is a signal processing filter. Further, a particle motion surface ghost is a ghost that is the upgoing wave with a time delay (see above) and a reversal of polarity. Specifically, the pressure created by the seismic wave has a ghost which has also a polarity reversal. The particle motion of the wave has a ghost without polarity reversal. Summing the pressure and particle motion recordings allows canceling.

In one or more embodiments, an angle dependent ghost wavelet is a wavelet defined as follows. As upgoing waves hit the sea-surface under a range of incidence angles, and each has a slightly different ghost, in the sense that the time it takes for the ghost to appear depends on the incidence angle. The time may vary, for example, by a few milliseconds. The time interval is largest for waves under normal-incidence (i.e., the normal to the ray-front makes a 90 degree angle with the sea-surface). Waves with smaller angles have a shorter ghost interval.

Additionally in the above equations, p represents ray-parameter, which is reciprocal to the apparent velocity of the wave-front at the sea-surface; k represents wavenumber, which is the number of waves per unit distance perpendicular to the wavefront (which may be measured in "per meter"); $\omega$ represents temporal frequency, which is the repetition rate of a periodic waveform (which may be measured in "per second" or hertz); kz is a wavenumber; $\rho$ is the density of water.

In one or more embodiments, in Element 204, the L1 estimate is further refined based on $V_{z,L1}(k,\omega)$ to generate the corrected marine seismic data. Specifically, the initial corrected marine seismic data (i.e., the L1 estimate of up-going seismic wave) is combined with the estimate of the vertical component of the particle motion based on a pre-determined formula. For example, the corrected marine seismic data (denoted as $u_1(k,\omega)$) may be a weighted summation of the water pressure data and the estimated water particle velocity data as Equation 4 below.

$$u_1(k,\omega) = \frac{1}{2}(P(k,\omega) + G_V(k,\omega)u_{L1}(k,\omega)) \quad \text{(Eq. 4)}$$

In another example, the corrected marine seismic data (denoted as $u_2(k,\omega)$) may be a parameterized weighted summation of the water pressure data and the estimated water particle velocity data as Equation 5 below.

$$u_2(k,\omega) = \frac{1}{4}(G_P^*(k,\omega)P(k,\omega) + G_V^*(k,\omega)G_V(k,\omega)u_{L1}(k,\omega)) \quad \text{(Eq. 5)}$$

Other types of mathematical formula may also be used to combine $u_{L1}(k,\omega)$ and $V_{z,L1}(k,\omega)$ to generate the corrected marine seismic data. In one or more embodiments, as will be described later in Element 206, the particular mathematical formula and/or the numerical coefficients used in the formula may be adjusted such that the corrected marine seismic data may be used for time lapse analysis.

Generally, the x-t domain is the domain in which the marine seismic data is acquired, where x represents distance between seismic source and receiver, and t represents time-axis of the seismic trace. The tau-p domain is another domain and transform well known in the art. This tau-p transform is sometimes referred to as slant-stacking, i.e., summing the amplitudes of the x-t data along a slanted line to produce a trace in the tau-p domain, wherein tau represents a time axis, and p represents a ray-parameter that is the temporal moveout between traces for the slanted summation. In one or more embodiments, the corrected marine seismic data is calculated in tau-p domain as described by the procedure below.

(1) Transform the individual shot records from the x-t domain into the tau-p domain.

For each ray-parameter p trace, create the linear system (i.e., equation 0) relating recorded pressure wave data in the tau-p domain to the up-going seismic wave in the tau-p domain using a convolution matrix which includes the ghost wavelet along its diagonal.

(2) Use an L1 solver to solve for the L1 estimate of the up-going seismic waves. In one or more embodiments, the L1 estimate is solved for a full frequency range between 0 Hz and 250 Hz for a temporal sampling interval of 2 ms.

(3) Convolve the full frequency range sparse spike estimate with the sea-surface ghost of the vertical component of particle motion to obtain the L1 estimate of the vertical velocity of water particle motion, referred to as L1 pseudo-$V_z$ data.

(4) Sum the recorded pressure wave data and the L1 pseudo-$V_z$ data in the tau-p domain and divide by 2 to obtain the final estimate of the up-going seismic wave in the tau-p domain.

(5) Use the inverse tau-p transform to yield the L1 pseudo-$V_z$ estimate of the up-going seismic wave in the x-t domain.

In summary, the up-going seismic wave (i.e., up-going P-wave) $\hat{P}_{up}(\omega, p)$ is estimated for a ray parameter P according to Equation 6 below.

$$\hat{P}_{up}(\omega,p) = 0.5(P(\omega,p) + G_V(\omega,p)L1P_{up}(\omega,p)), \quad \text{(Eq. 6)}$$

where $G_V(\omega,p)$ denotes the sea-surface ghost of the vertical component of particle motion (i.e., particle motion surface ghost) and $L1P_{up}(\omega, P)$ designates the L1 deghosted pressure data (i.e., corrected marine seismic data) as a function of angular frequency and ray-parameter. A sea-surface ghost is the ghost due to the down-going wave created at the sea-surface. Downgoing waves appear a few milliseconds after the up-going waves in marine recordings and appear to be similar to ghost signals.

In one or more embodiments, the up-going P-wave $\hat{P}_{up}(\omega, p)$ given in Equation 6 is used as the corrected marine seismic data.

In another example, the up-going P-wave $\hat{P}_{up}(\omega,p)$ is estimated by combining the de-phased pressure recording (i.e., the first term in the right hand side of Equation 6) with the L1-deghosted data after convolution with the autocorrelation of the $V_z$ ghost (i.e., the second term in the right hand side of Equation 6).

$$\hat{P}_{up}(\omega,p)=0.25(G_P^*(\omega,p)P(\omega,p)+|G_V(\omega,p)|^2 L1 P_{up}(\omega,p)), \quad (Eq.\ 7)$$

In yet another example, the optimum deghosting is applied to the actual pressure data and the pseudo-Vz data.

In one or more embodiments, the up-going P-wave $\hat{P}_{up}(\omega, p)$ given in Equation 7 is used as the corrected marine seismic data.

In Element 204.1, a determination is made as to if time lapse analysis is to be performed. If no time lapse analysis is to be performed, the method proceeds to Element 208. Otherwise, the method continues to Element 205 to perform the time lapse analysis.

In Element 205, current marine seismic data is obtained corresponding to the subterranean formation under the water surface. In one or more embodiments, the current marine seismic data is generated from an improved underwater sensor (e.g., dual-sensor) and include both water pressure data and measured water particle velocity data, referred to as a multi-component monitoring survey.

In Element 206, the corrected marine seismic data is validated for use in the time lapse analysis. Specifically, it is verified whether the corrected marine seismic data and the current marine seismic data are comparable for the requirement of time lapse analysis. Generally, any introduced data artifact or remaining interference induced data degradation after the upgrading process described in Elements 202-204 has to be less than a user defined threshold, such that differences in seismic data comparison may be attributed to changes in geologic structure. As noted above in the discussion of Element 204, using the current marine seismic data (e.g., of the multi-component monitoring survey) as a reference, a particular mathematical formula and/or numerical coefficients contained therein may be selected to compute the corrected marine seismic data for the vintage survey to minimize the data artifact.

In one or more embodiments, the pressure component of the multi-component monitoring survey may be used to validate the vintage survey upgrading process. In this case, the estimation technique to compute the pseudo-$V_z$ data for upgrading the vintage survey (e.g., as outlined above in Eq. 3) is also applied to the pressure data of the multi-component monitoring survey. The resulting pseudo-$V_z$ data is then compared to the acquired $V_z$ data in the multi-component monitoring survey to generate a measure of similarity. If the similarity exceeds a user defined threshold, the corrected marine seismic data of the vintage survey is considered valid for comparing to the current marine seismic data in the time lapse analysis. If the similarity is less than the pre-determined threshold, the mathematical formula used to combine the pseudo-$V_z$ data and pressure wave data for upgrading the vintage survey may be adjusted until the vintage survey is upgraded and validated.

In Element 207, the time lapse analysis is performed by comparing the corrected marine seismic data of the vintage survey and the current marine seismic data of the multi-component monitoring survey to determine the difference. Accordingly, a change in geologic structures in the subterranean formation may be detected if the difference exceeds a criterion empirically determined based on equipment measurement error. For example, the criterion may be specified to disqualify any difference introduced by equipment noise. In particular, the difference corresponds to geologic changes occurring subsequent to the vintage survey.

In Element 208, a field operation is performed based on the corrected marine seismic data from Element 204 and/or the time lapse analysis result from Element 207. For example, drilling, fracturing, or other production operation may be performed based on the subterranean seismic image derived from the corrected marine seismic data. In another example, the marine time-lapse analysis may indicate that hydrocarbon drainage has been minimal in a certain part of the reservoir. Accordingly, additional wells are drilled to access those parts of the reservoir.

Additional features, systems and/or methods of processing collected survey data are further detailed below in the examples depicted in FIGS. 3.1 and 3.2. These additional features, systems and/or methods represent possible implementations and are included for illustration purposes and should not be construed as limiting. Moreover, it will be understood that different implementations of processing collected survey data may include all or different subsets of aspects described below. Furthermore, the aspects described below may be included in any order, and numbers and/or letters placed before various aspects are done for ease of reading and in no way imply an order, or level of importance to their associated aspects. Additionally, the following aspects may be carried out manually, in software, firmware, logic, hardware or any combination thereof.

FIGS. 3.1.1, 3.1.2, 3.2.1 and 3.2.2 depict various screenshots that further illustrate the processing of collected survey data in accordance with one or more embodiments.

Specifically, the marine seismic data shown in FIGS. 3.1.1, 3.1.2, 3.2.1 and 3.2.2 relate to a 3D over/sparse-under experiment, with two under streamers towed at a depth of 20 m, while six shallow streamers were towed at a depth of 6 m. Based on these streamer recordings, the L1 pseudo-$V_z$ deghosting results are then compared with the optimum deghosting results achieved by full 3D processing of the over/sparse-under data as reference.

FIGS. 3.1.1 and 3.1.2 shows five data plots relating to low-offset data from a single shot record of the streamer recordings after NMO (i.e., normal moveout) correction. From left to right of FIG. 3.1.1, the data plot A (310-1) shows the pressure data (P) from the cable at 20-m depth; the data plot B (310-2) shows the output from Wiener inverse filtering of the pressure ghost wavelet (L2), using standard pre-whitening stabilization to overcome division by zero; and the data plot C (310-3) shows the estimate of the up-going seismic waves from optimum deghosting processing of the over/sparse-under data (ODG) as the reference for all deghosting results.

In addition, in FIG. 3.1.2, the data plot D (310-4) and the data plot E (310-5) show two results from the L1 pseudo-$V_z$ deghosting technique. In particular, the data plot D (310-4) shows the result using the iteratively reweighted least-squares (IRLS) algorithm (L1A) for L1-deconvolution, and the data plot E (310-5) shows the result using the L1-magic with Dantzig selector algorithm (L1B) for L1-deconvolution. Time gate (311) is shown around 2.2 to 2.3 s of FIGS. 3.1.1 and 3.1.2 to illustrate the temporal resolution of the original data and the different versions of deghosted data. The data plot C (310-3) from the over/sparse-under data with optimum deghosting shows the best quality, which allows identification of two strong events with a weaker event in the middle, an interpretation that would not be possible on the original data shown in the data plot A (310-1). The result shown in the data plot D (310-4) from the L1A based L1-deconvolution comes close to the quality of the ODG data in the data plot C (310-3), without fully matching it, and is somewhat superior to the result shown in the data plot E (310-5) from the L1B based L1-deconvolution. Interestingly enough, the result shown in the data plot B (310-2) from inverse ghost wavelet filtering (L2) is quite good as well, which is due to the zero phasing of the ghost wavelet and spectral equalization between the notch frequencies.

FIGS. 3.2.1 and 3.2.2 shows the comparison of related amplitude spectra of a short time and offset gate around the water-bottom reflection to illustrate the "notch-filling" capabilities of the deghosting techniques. Consistent with FIGS. 3.1.1 and 3.1.2, from left to right of FIG. 3.2.1, the data plot a (320-1) shows the spectra of the original data (P), the data plot b (320-2) shows the output from Wiener inverse filtering of the pressure ghost wavelet (L2), and the data plot c (320-3) shows the estimate of the up-going seismic waves from optimum deghosting processing of the over/sparse-under data (ODG). In FIG. 3.2.2 the data plot d (320-4) and the data plot e (320-5) show the results from the two versions of the L1 pseudo-Vz deghosting technique. The spectrum of the original data in the data plot a (320-1) clearly shows the spectral notches at the expected frequency separation of about 40 Hz, with the amplification of amplitudes between the notch frequencies by a factor of two (6 dB). All deghosting techniques in comparison show the down scaling by 6 dB between the notch frequencies, but different degrees of "notch-filling" ("notch narrowing" in the case of L2), with the capabilities of the ODG again being best, those of the inverse Wiener filter being worst, and those of the two L1 deghosting techniques in between.

Figure 4:
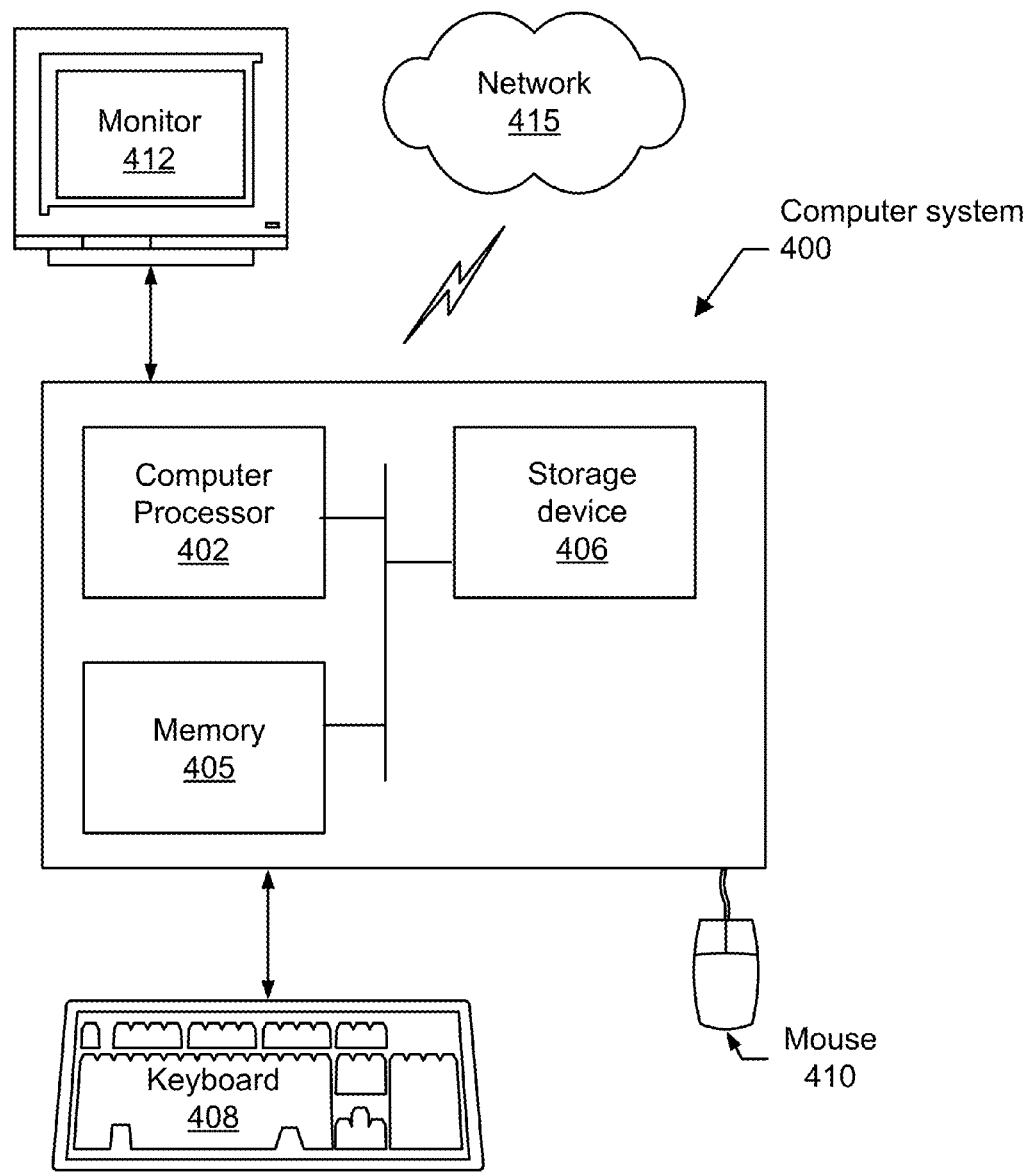
FIG. 4 depicts a computer system using which one or more embodiments of processing collected survey data may be implemented.

Embodiments of processing collected survey data may be implemented on virtually any type of computer regardless of the platform being used. For instance, as shown in FIG. 4, a computer system (400) includes one or more computer processor(s) (402) such as a central processing unit (CPU) or other hardware processor, associated memory (405) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410) or a microphone (not shown). Further, the computer (400) may include output means, such as a monitor (412) (e.g., a liquid crystal display LCD, a plasma display or cathode ray tube (CRT) monitor). The computer system (400) may be connected to a network (415) (e.g., a local area network (LAN), a wide area network (WAN) such as the Internet, or any other similar type of network) via a network interface connection (not shown). Those skilled in the art will appreciate that many different types of computer systems exist (e.g., workstation, desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system (400) includes at least the minimal processing, input and/or output means necessary to practice one or more embodiments.

Further, those skilled in the art will appreciate that one or more elements of the aforementioned computer system (400) may be located at a remote location and connected to the other elements over a network. Further, one or more embodiments may be implemented on a distributed system having a plurality of nodes, where each portion of the implementation may be located on a different node within the distributed system. In one or more embodiments, the node corresponds to a computer system. Alternatively, the node may correspond to a processor with associated physical memory. The node may alternatively correspond to a processor with shared memory and/or resources. Further, software instructions to perform one or more embodiments may be stored on a computer readable medium such as a compact disc (CD), a diskette, a tape or any other computer readable storage device.

The systems and methods provided relate to the acquisition of hydrocarbons from an oilfield. It will be appreciated that the same systems and methods may be used for performing subsurface operations, such as mining, water retrieval, and acquisition of other underground fluids or other geomaterials from other fields. Further, portions of the systems and methods may be implemented as software, hardware, firmware or combinations thereof.

While processing collected survey data has been described with respect to a limited number of embodiments, those skilled in the art, having benefit of this disclosure, will appreciate that other embodiments may be devised which do not depart from the scope of processing collected survey data as disclosed herein. Accordingly, the scope of processing collected survey data should be limited only by the attached claims.

What is claimed is:

1. A method to perform a marine seismic survey, comprising:
   obtaining marine seismic data corresponding to a subterranean formation under a water surface, wherein the marine seismic data is generated from a seismic sensor that is subject to an interference effect;
   generating, by a computer processor and using a deconvolution operation, corrected marine seismic data that compensates for the interference effect on the seismic sensor based at least in part on the marine seismic data;
   generating, by the computer processor, a marine seismic survey result based at least in part on the corrected marine seismic data; and
   displaying the marine seismic survey result on a display,
   wherein the deconvolution operation is based at least in part on an n-dimensional matrix operator comprising an n-dimensional ghost wavelet,
   wherein n represents a number of time samples in the marine seismic data,
   wherein the ghost wavelet represents the interference effect, and
   wherein the interference effect is caused by a seismic wave reflection from the water surface based at least in part on a depth of the seismic sensor.

2. The method of claim 1, wherein generating the corrected marine seismic data comprises:
   determining, by solving a system of linear equations using an L1 solver, an L1 estimate of an up-going seismic wave captured by the seismic sensor,
   wherein the system of linear equations relates the marine seismic data to the up-going seismic wave based on an n-dimensional matrix, and
   wherein the corrected marine seismic data is at least based on the L1 estimate.

3. The method of claim 2, wherein generating the corrected marine seismic data further comprises:
   generating estimated water particle velocity data from the L1 estimate using a convolution operator,
   wherein the convolution operator is determined at least by the depth of the underwater seismic sensor, and
   wherein the corrected marine seismic data is further based on the estimated water particle velocity data.

4. The method of claim 3,
wherein the marine seismic data comprises water pressure data, and
wherein the corrected marine seismic data comprises a weighted summation of the water pressure data and the estimated water particle velocity data.

5. The method of claim 1, wherein the marine seismic data is obtained from historical survey data, wherein generating the marine seismic survey result comprises:
obtaining current marine seismic data corresponding to a current status of the subterranean formation under the water surface, wherein the current marine seismic data is generated from a second seismic sensor, wherein the second seismic sensor reduces data degradation in the current marine seismic data; and
detecting, in response to determining a difference between the corrected marine seismic data and the current marine seismic data, a change in a geologic structure of the subterranean formation that occurred subsequent to generating the historical survey data.

6. The method of claim 5, wherein the current marine seismic data comprises water pressure data and measured water particle velocity data, the method further comprising:
generating estimated water particle velocity data from the water pressure data using at least the deconvolution operation,
wherein the detecting is further in response to determining that the measured water particle velocity data and the estimated water particle velocity data match based on a pre-determined criterion.

7. A system for performing a marine seismic survey, comprising:
a computer processor;
a marine seismic analyzer executing on the computer processor and configured to perform operations, the operations comprising:
obtaining marine seismic data corresponding to a subterranean formation under a water surface, wherein the marine seismic data is generated from a seismic sensor that is subject to an interference effect;
generating, using a deconvolution operation, corrected marine seismic data from the marine seismic data to compensate for the interference effect;
generating a marine seismic survey result based at least in part on the corrected marine seismic data; and
displaying the marine seismic survey on a display; and
a repository configured to store the marine seismic data, the corrected marine seismic data, and the marine seismic survey result,
wherein the deconvolution operation is based at least in part on an n-dimensional matrix operator comprising an n-dimensional ghost wavelet,
wherein n represents a number of time samples in the marine seismic data,
wherein the ghost wavelet represents the interference effect, and
wherein the interference effect is caused by a seismic wave reflection from the water surface based at least in part on a depth of the seismic sensor.

8. The system of claim 7, wherein generating the corrected marine seismic data comprises:
determining, by solving a system of linear equations using an L1 solver, an L1 estimate of an up-going seismic wave captured by the seismic sensor,
wherein the system of linear equations relates the marine seismic data to the up-going seismic wave based at least in part on an n-dimensional matrix, and
wherein the corrected marine seismic data is at least based at least in part on the L1 estimate.

9. The system of claim 8, wherein generating the corrected marine seismic data further comprises:
generating estimated water particle velocity data from the L1 estimate using a convolution operator,
wherein the convolution operator is determined at least by the depth of the underwater seismic sensor, and
wherein the corrected marine seismic data is further based on the estimated water particle velocity data.

10. The system of claim 9,
wherein the marine seismic data comprises water pressure data, and
wherein the marine seismic survey result comprises a weighted summation of the water pressure data and the estimated water particle velocity data.

11. The system of claim 7,
wherein the marine seismic data is part of historical survey data,
wherein the system further comprises:
a second seismic sensor configured to generate current marine seismic data corresponding to a current status of the subterranean formation under the water surface, wherein the improved underwater second seismic sensor reduces the data degradation in the current marine seismic data, and
wherein the computer system further comprises:
a time-lapse analyzer configured to detect, in response to determining a difference between the corrected marine seismic data and the current marine seismic data, a change in a geologic structure of the subterranean formation that occurred subsequent to generating the historical survey data,
wherein the marine seismic survey result comprises a description of the change in the geologic structure of the subterranean formation.

12. The system of claim 11, wherein the current marine seismic data comprises water pressure data and measured water particle velocity data, wherein the operations further comprise:
generating estimated water particle velocity data from the water pressure data using at least the deconvolution operation,
wherein the detecting is further in response to determining that the measured water particle velocity data and the estimated water particle velocity data match each other based at least in part on a pre-determined criterion.

13. A non-transitory computer readable medium comprising instructions for performing marine seismic survey, the instructions, when executed by a computer processor of a computer system, cause the computer system to perform operations, the operations comprising:
obtaining marine seismic data corresponding to a subterranean formation under a water surface, wherein the marine seismic data is generated from an underwater seismic sensor that is subject to an interference effect;
generating, using a deconvolution operation, corrected marine seismic data based at least in part on the marine seismic data to compensate for the interference effect;
generating a marine seismic survey result based on the corrected marine seismic data and displaying the marine seismic survey on a display,
wherein the deconvolution operation is based on an n-dimensional matrix operator comprising an n-dimensional ghost wavelet, wherein n represents a number of time samples in the marine seismic data, wherein the ghost wavelet represents the interference effect, and wherein the interference effect is caused by a seismic wave reflection from the water surface based on a depth of the underwater seismic sensor.

14. The non-transitory computer readable medium of claim 13, wherein generating the corrected marine seismic data comprises:

determining, by solving a system of linear equations using an L1 solver, an L1 estimate of an up-going seismic wave captured by the seismic sensor, wherein the system of linear equations relates the marine seismic data to the up-going seismic wave based at least in part on an n-dimensional matrix, and wherein the corrected marine seismic data is at least based on the L1 estimate.

15. The non-transitory computer readable medium of claim 14, wherein generating the corrected marine seismic data further comprises:

generating estimated water particle velocity data from the L1 estimate using a convolution operator, wherein the convolution operator is determined at least by the depth of the seismic sensor, and wherein the corrected marine seismic data is further based on the estimated water particle velocity data.

16. The non-transitory computer readable medium of claim 15, wherein the marine seismic data comprises water pressure data, and wherein the corrected marine seismic data comprises a weighted summation of the water pressure data and the estimated water particle velocity data.

17. The non-transitory computer readable medium of claim 13, wherein the marine seismic data is obtained from historical survey data, and wherein generating the marine seismic survey result comprises:

obtaining current marine seismic data corresponding to a current status of the subterranean formation under the water surface, wherein the current marine seismic data is generated from a second seismic sensor, wherein the second seismic sensor reduces data degradation in the current marine seismic data;

generating estimated water particle velocity data from the water pressure data using at least the deconvolution operation; and in response to determining that the measured water particle velocity data and the estimated water particle velocity data match each other based on a pre-determined criterion, and determining a difference between the corrected marine seismic data and the current marine seismic data, detecting a change in a geologic structure of the subterranean formation that occurred subsequent to generating the historical survey data.

* * * * *